H. SAURER.
AUTOMATIC EMBROIDERING MACHINE.
APPLICATION FILED JUNE 19, 1911.

1,155,007.

Patented Sept. 28, 1915.
2 SHEETS—SHEET 1.

Witnesses:
R. W. Dommers
Elizabeth Leckert

Inventor:
Hippolyt Saurer
By Henry Orth Jr.
Atty.

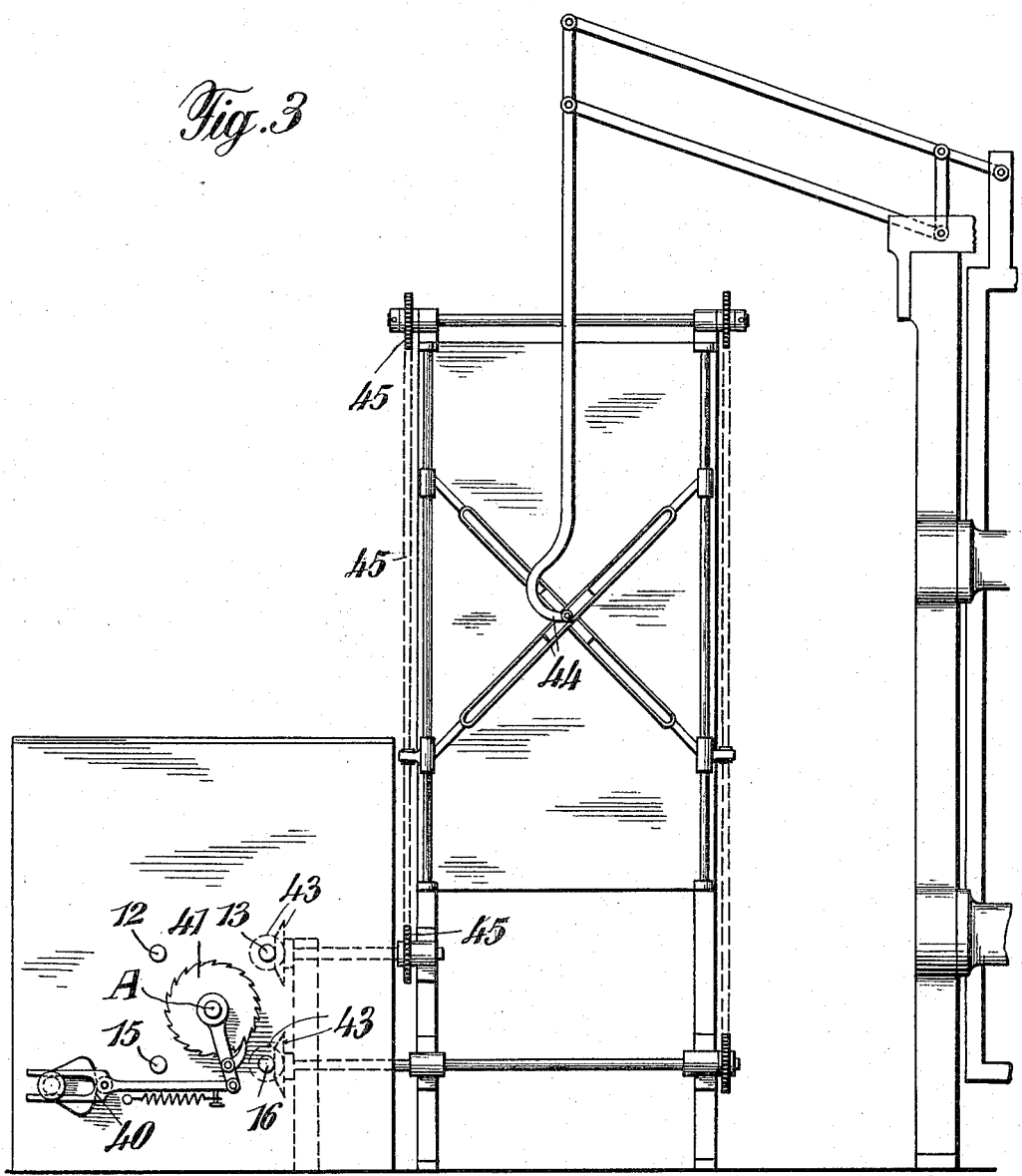

UNITED STATES PATENT OFFICE.

HIPPOLYT SAURER, OF ARBON, SWITZERLAND.

AUTOMATIC EMBROIDERING-MACHINE.

1,155,007. Specification of Letters Patent. Patented Sept. 28, 1915.

Application filed June 19, 1911. Serial No. 633,962.

*To all whom it may concern:*

Be it known that I, HIPPOLYT SAURER, a citizen of the Republic of Switzerland, residing at Arbon, Switzerland, have invented new and useful Improvements in Automatic Embroidering-Machines; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to improvements in automatic embroidering machines and consists in a device for converting a motion of rotation of a certain value into a variable rectilinear motion for impelling the frame. For moving the frame in any direction in a plane two components are necessary which are independent of each other and adapted to attain positive and negative values.

According to this invention the constant motion of rotation of a shaft which revolves in invariable direction is converted into a variable positive and negative motion. For this purpose the shaft is composed of at least two parts, the parts being connected to each other by a reversing gear so that the two parts revolve in contrary direction.

Motions of different direction become available hereby on the parts of the shaft.

Figure 1:
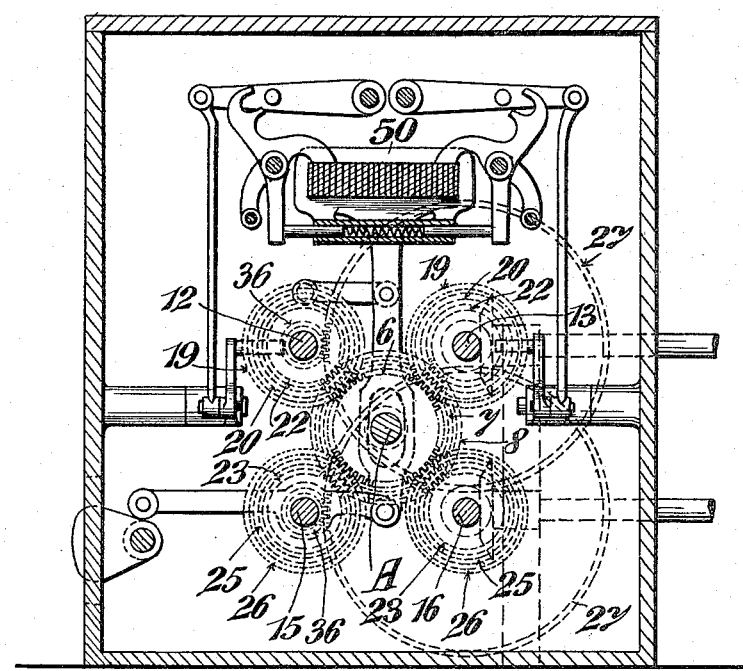
Figure 2:
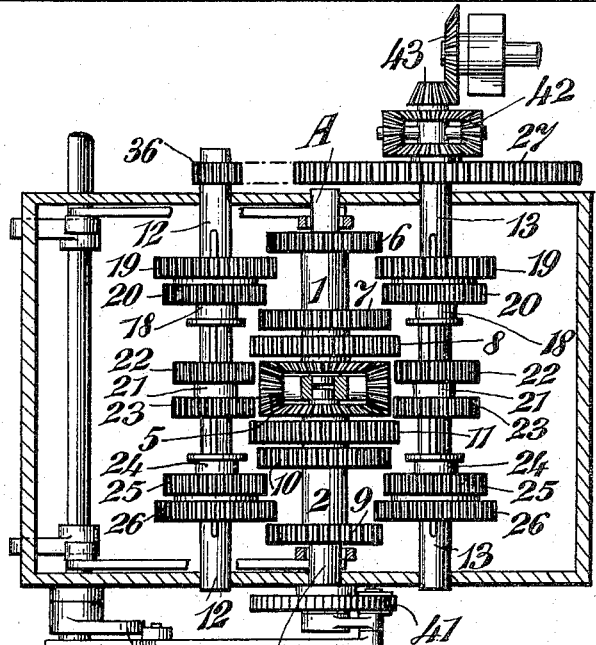

In the accompanying drawings Figure 1 shows a vertical section of said device, Fig. 2 is a plan view of the same, the shafts being shown as transferred into the same horizontal plane, Fig. 3 shows the device in connection with an embroidering machine.

To the shaft A is imparted a periodical motion of rotation of a certain value by means of a suitable cam mechanism 40 and a ratchet 41. The shaft A is composed of two parts 1 and 2, which are connected to each other by a reversing gear 5 causing the two parts 1 and 2 to rotate at the same speed but in contrary directions. To the part 1 are secured toothed wheels 6, 7 and 8 of different diameters. To the part 2 are also secured toothed wheels 9, 10 and 11 of different diameters. The wheels 6 and 9, as well as 7 and 10, and 8 and 11 are always of the same diameter. The shafts 12 and 13 are mounted parallel to the shaft A and carry each by slot and key, but movably in axial direction a couple of toothed wheels 19 and 20 of different diameters with a sleeve 18, a couple of toothed wheels 22 and 23 of the same diameter with a sleeve 21 and a couple of toothed wheels 25 and 26 of different diameters with a sleeve 24. The wheels 20 are of the same size as the wheels 25 and the wheels 19 are of the same size as the wheels 26. A toothed wheel 27 is secured to the shaft 13 and engages a wheel 36 of smaller diameter mounted on the shaft 12. The motion of the shaft 13 is transmitted as one component to the pin of the pantograph 44 by means of a differential gear 42, bevel wheels 43 and a chain and chainwheel mechanism 45.

For forming the second component two more shafts 15 and 16 (Fig. 1) are arranged parallel to the shaft A. These two shafts are omitted in Fig. 2, since they are of the same form and carry the same wheels as the shafts 12 and 13. The shaft 16 is connected to the pantograph in the same manner as the shaft 13. If, for instance by shifting the wheels 19, of the shafts 13, or 12 to engage wheel 6 a motion is to be obtained which is of the same value but of the contrary direction as when the wheels 26 and 9 engage each other. The wheels 6 and 19, and 9 and 26 of the shaft 12 are of the same ratio of gearing, excepting that a further ratio of gearing is introduced in this case by the wheels 36 and 27. Other variations can be obtained by the wheels 20 and 7, 25 and 10, 22 and 8 and 23 and 11.

The displacement of the wheels 19—26 is positively and automatically effected by the Jacquard apparatus 50 which by suitable means actuates the sleeves 18, 21 and 24.

The shaft A can be composed of more than two parts, as four parts for instance.

I claim:

1. In mechanism for transmitting movements to the embroidery frame of embroidering machines; the combination which comprises an actuating shaft composed of alined sections and reversing mechanism between them, means for imparting movement to said shaft, and only two parallel shafts driven from said shaft for imparting movement to the embroidery frame for one of its components of movement, the movements imparted to the actuating shaft being in the same direction and through the same angle.

2. In mechanism for transmitting movements to the embroidery frame of an embroidering machine, the combination which comprises an actuating shaft composed of two alined sections and reversing mechanism between them, whereby said sections have equal and opposite rotation, means for imparting rotation to one of the sections, and only two parallel shafts driven from said shaft for imparting movement to the embroidery frame for one of its components of movement, the movements imparted to the actuating shaft being in the same direction and through the same angle.

3. In mechanism for transmitting movements to the embroidery frame of an embroidering machine, the combination which comprises an actuating shaft composed of two alined sections and reversing mechanism between them whereby said sections have equal and opposite rotation, cam-actuated pawl and ratchet mechanism for imparting a step by step rotation to one of the sections, and only two parallel shafts driven from said shaft for imparting movement to the embroidery frame for one of its components of movement, the movements imparted to the actuating shaft being in the same direction and through the same angle.

4. In combination, an actuating shaft consisting of a plurality of alined sections, reversing mechanism between adjacent sections, different sized gear wheels secured on each section, only two shafts for each component of movement parallel to the actuating shaft, gear wheels slidable but not rotatable relatively to said shafts arranged to selectively gear with the gear wheels on the sections, differential mechanism between the parallel shafts, a member from which the embroidery frame is moved and rotated by the last named differential mechanism, and means to actuate one of the sections.

5. In combination, an actuating shaft consisting of alined sections, reversing mechanism between the sections, different sized gear wheels secured on each section, only two shafts for each component of movement parallel to the actuating shaft, gear wheels slidable but not rotatable relatively to said two shafts and arranged to selectively gear with the gear wheels on the sections, differential mechanism between the parallel shafts, a member rotated by the last named differential mechanism from which the embroidery frame is actuated and means for actuating one of said sections step-by-step.

6. In mechanism for transmitting movements to the embroidery frame of embroidering machines, the combination which comprises a single actuating shaft in two sections, reversing mechanism between the sections whereby said sections have equal and opposite movements, different sized gear wheels on each section, a set composed of only two parallel shafts, different sized gear wheels mounted on the parallel shafts for selective engagement with wheels on the actuating shaft, and mechanism for algebraically adding the movements of said set of shafts for imparting movement to the embroidery frame for one of its components of movement, a second set of like parallel shafts, gear wheels thereon, and adding mechanism for imparting movement to the embroidery frame for its other component of movement, and means for imparting a step-by-step rotation to one of said sections in one direction and through equal angular steps.

In testimony that I claim the foregoing as my invention, I have signed my name in presence of two subscribing witnesses.

HIPPOLYT SAURER.

Witnesses:
 ERNST FISCHER,
 AUGUST RUIGG.

Copies of this patent may be obtained for five cents each, by addressing the "Commissioner of Patents, Washington, D. C."